Aug. 3, 1926.
W. A. BRODIN ET AL
1,594,814
BATTERY INDICATOR
Filed Oct. 8, 1924
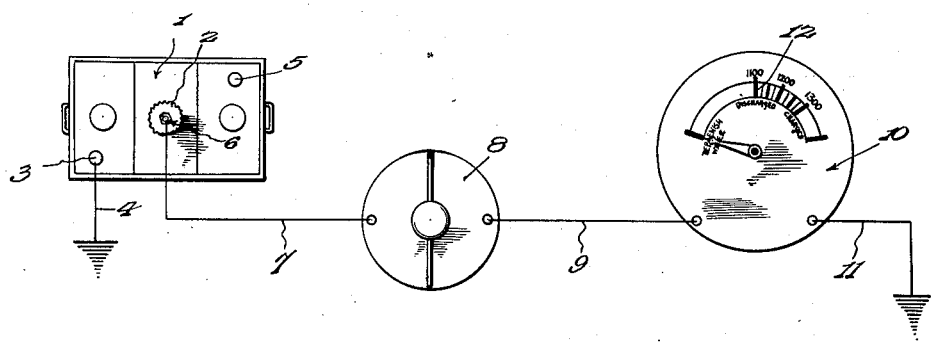
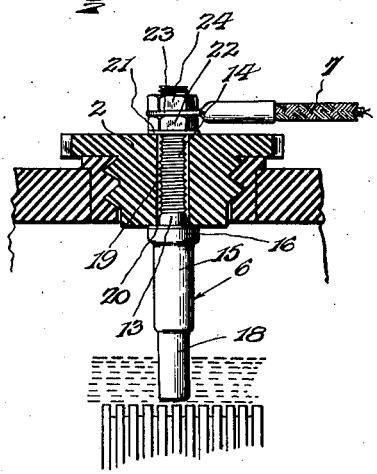
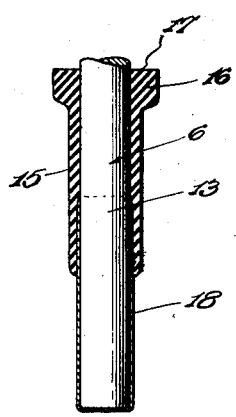
Inventors
W. A. Brodin.
G. S. Rickenbock.
By Lacy & Lacy, Attorneys Patented Aug. 3, 1926.

1,594,814

UNITED STATES PATENT OFFICE.

WILLIAM A. BRODIN AND GEORGE S. RICKENBACH, OF PITTSBURGH, PENNSYLVANIA.

BATTERY INDICATOR.

Application filed October 8, 1924. Serial No. 742,486.

This invention relates to improvements in battery indicators and more particularly to means for automatically indicating the condition of the electrolyte in a battery, not only as regards the specific gravity of the electrolyte, but also the level of the same within the battery. It is a well known fact that motorists are more or less careless with regard to their batteries, frequently permitting the same to remain unattended for a long period of time with the result that the battery will fail to give service when required and must be repaired, recharged, or water added thereto. Heretofore, it has been necessary, in order to determine the specific gravity of the electrolyte, to employ a hydrometer and, likewise, it has been necessary to frequently examine the battery, if proper care is taken of the same, to ascertain whether or not the electrolyte has become so low in the battery as to require the addition of water to bring it to the proper level, and it is chiefly due to the fact that these tests are more or less troublesome, that motorists have generally failed to perform the same at sufficiently frequent intervals to keep their batteries in proper condition. Therefore, the present invention has, as its general object, to provide means which may be readily installed in connection with any storage battery and upon any type of motor vehicle, to indicate to the motorist, at a glance, the precise condition of his battery, thereby obviating the necessity of actually examining the battery itself.

The indicator means embodying the invention, includes among other elements, a post which is associated with one of the vent caps of the battery and the lower end of which post is designed to be immersed in the electrolyte above the upper edges of the plates of the cell with which the said vent cap is associated, and another object of the present invention is to provide a post of such construction that sulphation will be positively precluded and in which the external resistance to current flow will be negligible, so that the readings obtained by the means of the present invention will be accurate and dependable.

In the accompanying drawings:—

Figure 1 is a diagrammatic view illustrating the application of the principles of the invention.

Figure 2 is a vertical sectional view through the upper portion of a storage battery cell, illustrating the post embodying the invention mounted in the vent plug or cap of the said cell.

Figure 3 is a detail vertical sectional view through the lower portion of the post.

Figure 1 of the drawings indicates schematically the manner in which the invention is carried out and in this figure the numeral 1 indicates an ordinary storage battery including three cells each provided with a vent cap indicated by the numeral 2, one end cell being provided with a negative binding post 3 from which leads a wire 4 to ground, and the other end cell having a positive binding post 5 to which may be connected the usual lead (not shown) for the lighting system of the car, and other electrical devices which are to be supplied with current. The vent cap 2 for the middle cell of the battery supports the terminal post embodying the invention, which post is clearly illustrated in Figures 2 and 3 of the drawings and indicated in general by the numeral 6. A wire 7 is led from this post to one terminal of a switch which is indicated by the numeral 8 and is mounted upon the instrument board of the automobile and may be of any desired type. The numeral 9 indicates another conductor wire which is led from the other terminal of the switch to one binding post of a specific gravity meter, indicated in general by the numeral 10, and another conductor wire 11 is led from the other binding post of said meter and is grounded to the frame of the automobile, so that when the switch 8 is closed, a circuit will be completed through the frame of the automobile, the electrolyte, the switch, and the meter 10.

As illustrated in Figure 2 of the drawings, the lower end portion of the terminal post 6 is immersed in the electrolyte in the middle cell of the battery, and, as previously stated, when the switch 8 is closed, a circuit will be completed through the frame of the automobile, through the electrolyte by way of the binding post 3 and terminal post 6, wire 7, switch 8, wire 9, and the specific gravity meter 10. The meter 10 does not differ in its construction from an ordinary volt meter except that its range is limited to approximately two volts, and the scale of the meter, which is indicated by the numeral 12, is not graduated in terms of volts but in terms of specific gravity, we having, by experiment and test, evolved a table whereby variations in voltage may be expressed in terms of variations in specific gravity. Therefore, with the meter 10 arranged upon the instrument board of the automobile, the driver has before him substantially the equivalent of the ordinary hydrometer, a depleted electrolytic solution in the battery resulting in current of a lower voltage passing through the specific gravity meter, and an electrolytic solution of proper strength passing a current of higher voltage to the said meter. Therefore, the driver of the automobile may determine at a glance the precise condition of the electrolyte of the battery without the necessity of inspecting the battery itself, this being accomplished by merely closing the switch 8. Of course, current will pass through the meter 10 so long as the terminal post 6 is immersed in the electrolyte, but should the driver neglect to replenish his battery with water and should the electrolyte level fall to the danger point and not contact the lower extremity of the terminal post, then, upon closing of the switch 8, there will be no current passed and consequently no deflection of the indicating pointer of the meter. Therefore, the driver of the automobile will be instantly warned that the battery requires water.

The post 6 is preferably of brass and comprises a smooth cylindrical portion 13 and a threaded portion indicated by the numeral 14. Except for the fact that the upper portion of the post is threaded as at 14, the post is of uniform diameter throughout its entire length and, therefore, may be easily manufactured. In order that the cylindrical portion 13 of the post may be protected from contact with the electrolyte and also in order to provide the post with a shoulder for a purpose to be presently explained, a sleeve 15 of hard rubber is molded onto the cylindrical portion of the post and at its upper end is increased in diameter to provide a circumscribing shoulder 16 having a flat upper face 17. The face 17 is located immediately below the juncture of the smooth and threaded portions of the post, as clearly shown in Figure 2, and the lower end of the sleeve 15 terminates a greater or less distance above the lower end of the said post as shown in the said Figure 2 and also in Figure 3. It will be readily understood that the lower portion of the cylindrical part 13 of the post is to be immersed in the electrolyte, and where attempts have been previously made to employ a post in this particular location, it has been found that sulphation will take place, thereby either short circuiting the battery plates or, by reason of the thin coating of sulphate upon the post, creating such external resistance to the passage of current as to render the post unfit for use. In order to provide against this contingency, the present invention contemplates providing the cylindrical portion 13 of the post with a plating 18 of gold, this plating covering the lower end of the post and the cylindrical portion 13 thereof to a point somewhat above the lower end of the sleeve 15, and the plating of the post being effected prior to the molding of the sleeve upon the post, so that the lower portion of the sleeve completely encloses and surrounds the upper portion of the plated length of the portion 13 of the post, as clearly shown in Figure 3, thereby preventing any of the electrolyte reaching that portion of the post which is not protected by the plating of gold. Inasmuch as gold is not affected by the acid solution employed in the battery, sulphation cannot take place and the portion of the post which is immersed in the electrolyte will remain bright and non-corroded, thereby insuring of proper functioning of the post as a terminal.

In adapting the post to the vent cap 2, heretofore referred to, said cap is formed axially with a bore 19 through which the threaded upper portion 14 of the post is fitted, as shown in Figure 2, a hard rubber washer 20 being adapted to the upper end of the cylindrical portion 13 of the post so as to rest upon the shoulder 17 and be confined between said shoulder and the under side of the cap 2. A metallic washer 21 is fitted onto the threaded portion of the post which projects above the upper side of the cap 2, and a nut 22 is threaded onto this portion of the post and is tightened to bind the washer against the upper side of the cap and draw the washer 20 into firm engagement with the under side of the cap. The conductor wire 7 is provided with the usual terminal tip 23 which is fitted to the threaded portion of the post above the nut 22, and a binding nut 24 is fitted onto the said threaded portion of the post and tightened to bind against the tip 23.

From the foregoing description of the invention, it will be evident that the driver of an automobile equipped with the present invention, may instantly observe the condition of the battery by closing the switch 8, the specific gravity meter 10 giving a reading in terms of specific gravity so that, if the driver is familiar with the use of a hydrometer, as he should be, he can as accurately determine the condition of the battery as though he actually tested the electrolyte by the use of a hydrometer. It will also be understood that while the post 6 is made of brass and is, therefore, inexpensive to manufacture, it is not open to the objection which a plain brass post would present, namely that of sulphation, because of the fact that its portion which is to be immersed in the electrolyte is entirely covered with a plating of gold, which is not in any way subject to sulphation. It will likewise be observed that by protecting the upper portion of the cylindrical part 13 of the post with the hard rubber sleeve 15 which is molded thereon, the electrolyte is prevented from coming in contact with the said portion, and furthermore, by so arranging the sleeve that its lower portion will encompass and surrround the upper portion of the plating 18, the entrance of the electrolyte into the sleeve and between the sleeve and post at the lower end of the sleeve is not only prevented, but should there be any slight seepage of the electrolyte at this point, no damage will result inasmuch as this portion of the post is likewise covered with the plating 18. It will furthermore be observed that due to the fact that the washer 20 firmly abuts the under side of the cap 2, none of the electrolyte can enter between the post and cap to come in contact with the threaded upper portion of the said post.

Having thus described the invention, what we claim is:—

In an electrolytic cell and in combination with a removable closure therefor, a post of base metal having its upper portion passing through the said closure and threaded, and having its lower portion covered by a precious metal, a non-corrodible sleeve fixed upon the intermediate portion of the post and abutting the under side of the closure at its upper end, and having its lower portion overlapping the upper portion of the covering of precious metal, and a nut threaded upon the upper end of the post and acting jointly with the said sleeve to hold the post in place.

In testimony whereof we affix our signatures.

WILLIAM A. BRODIN. [L. S.]
GEORGE S. RICKENBACH. [L. S.]